United States Patent
Ivankovic et al.

(10) Patent No.: US 11,150,877 B2
(45) Date of Patent: Oct. 19, 2021

(54) AUTOMATICALLY GENERATING MACHINE LEARNING MODELS FOR SOFTWARE TOOLS THAT OPERATE ON SOURCE CODE

(71) Applicant: Google LLC, Mountain View, CA (US)

(72) Inventors: Marko Ivankovic, Mountain View, CA (US); Vedrana Jankovic, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/676,032

(22) Filed: Nov. 6, 2019

(65) Prior Publication Data

US 2021/0132915 A1    May 6, 2021

(51) Int. Cl.
| | |
|---|---|
| *G06F 8/34* | (2018.01) |
| *G06N 20/00* | (2019.01) |
| *G06F 8/40* | (2018.01) |
| *G06N 5/04* | (2006.01) |

(52) U.S. Cl.
CPC .............. *G06F 8/34* (2013.01); *G06F 8/40* (2013.01); *G06N 5/04* (2013.01); *G06N 20/00* (2019.01)

(58) Field of Classification Search
CPC .... G06F 8/34; G06F 8/40; G06F 8/75; G06N 20/00; G06N 5/04; G06N 3/084
See application file for complete search history.

(56) References Cited

U.S. PATENT DOCUMENTS

| | | | | |
|---|---|---|---|---|
| 2018/0150742 | A1* | 5/2018 | Woulfe | G06N 20/00 |
| 2018/0165554 | A1* | 6/2018 | Zhang | G06K 9/6256 |
| 2018/0321924 | A1* | 11/2018 | Bezalel | G06F 8/65 |
| 2018/0349103 | A1* | 12/2018 | Brown | G06F 8/35 |
| 2020/0026577 | A1* | 1/2020 | Dias | G06F 8/75 |
| 2020/0073639 | A1* | 3/2020 | Prasad | G06N 20/00 |
| 2020/0159505 | A1* | 5/2020 | Narayanan | G06F 8/36 |
| 2020/0341755 | A1* | 10/2020 | Woulfe | G06N 20/00 |

* cited by examiner

*Primary Examiner* — Daxin Wu
(74) *Attorney, Agent, or Firm* — Honigman LLP; Brett A. Krueger (57) ABSTRACT

A method includes receiving a code insight request requesting a code insight for target source code. The code insight request includes the target source code and a tool type indicator specifying that the software development tool comprises one of a code labeling type of software development tool or a code transformation type of software development tool. The method also includes obtaining a machine learning model based on the tool type indicator and generating the code insight using the machine learning model. The code insight includes one of a predicted label for the target source code when the tool type indicator specifies that the software development tool comprises the code labeling type of software development tool, or a predicted code transformation for the target source code when the tool type indicator specifies that the software development tool comprises the code transformation type of software building tool.

22 Claims, 7 Drawing Sheets

Code Insight Request GUI 220, 220a

```
210 while b ≠ 0 {
    if a > b {
        a := a − b ;
    }
    else {
        b := b − a ;
    }
}
return a;
```

Submit

What type of tool are you building?  205
● CODE LABELING
  - Code complexity
  - Quality of code
  - Testing requirement
  - Difficulty rating ○ CODE TRANSFORMATION
  - Build Error Fixer
  - Compiler/Interpreter
  - Revisions
  - Suggested Replacement Code
                                              207
Select a type of outcome characteristic
○ Build Result        ○ Metadata
○ Run Time            ● User Comments

FIG. 4A

Code Insight Request GUI 220, 220b

```
210 while b ≠ 0 {
    if a > b {
        a := a − b ;
    }
    else {
        b := b − a ;
    }
}
return a;
```

Submit

What type of tool are you building?  205
○ CODE LABELING
  - Code complexity
  - Quality of code
  - Testing requirement
  - Difficulty rating ● CODE TRANSFORMATION
  - Build Error Fixer
  - Compiler/Interpreter
  - Revisions
  - Suggested Replacement Code
                                              207
Select a type of outcome characteristic
● Build Result        ○ Metadata
○ Run Time            ○ User Comments

FIG. 4B

Predicted Label GUI 220, 220c

```
210
while b ≠ 0 {
    if a > b {
        a := a − b ;
    }
    else {
        b := b − a ;
    }
    return a;
}
```

CODE INSIGHT — 400,400a
Insight analysis by the machine learning model predicts that the provided target source code is better when tested.

EMULATED HUMAN-GENERATED COMMENTS — 320

FIG. 4C

Predicted Code Transformation GUI 220, 220d

```
210
while b ≠ 0 {
    if a > b {
        a := a − b ;
    }
    else {
        b := b − a ;
    }
    return a;
}
```

EXECUTABLE CODE — 400,400b

```
L28   movf   _n,f
      btfsc  STATUS,Z
      goto   L41
      movf   _n,f
      addwf  _sum,f
      btfsc  STATUS,C
      incf   _sum+1,f
      decf   _n,f
      goto   L28
L41
```

— 320
BUILD RESULT
SUCCESS

AUTOMATICALLY GENERATING MACHINE LEARNING MODELS FOR SOFTWARE TOOLS THAT OPERATE ON SOURCE CODE

TECHNICAL FIELD

This disclosure relates to generating machine learning models for software tools that operate on source code.

BACKGROUND

A programming tool or software development tool is a computer program that software developers use to create, debug, maintain, or otherwise support other programs and applications. The term usually refers to relatively simple programs, that can be combined together to accomplish a task, much as one might use multiple hand tools to fix a physical object. The most basic tools are a source code editor and a compiler or interpreter. Other tools are used more or less depending on the language, development methodology, and individual engineer, and are often used for a discrete task, like a debugger, profiler, or static program analyzer. Static program analysis is the analysis of computer software that is performed without actually executing programs. In most cases, the analysis is performed on some version of the source code. Software development tools may be discrete programs, executed separately—e.g., from the command line—or may be parts of a single large program, often called an integrated development environment (IDE).

A codebase (or code base) is a collection of human-written and machine generated source code snippets used to build a particular software system, application, or software component. The codebase is typically stored in a source code repository. Revisions to the codebase may be managed by a version control system. In many cases, it can take specialized software engineers months to create a codebase for building specific software development tool. Machine learning models may help expedite the build process for these software development tools by automatically identifying errors in human-written source code snippets. Such machine learning models, however, are specifically tailored for the software development tool being built, and require specialized software engineers to create the machine learning models for use by different software engineers actually building the software development tool.

SUMMARY

One aspect of the disclosure provides a method for generating code insights. The method includes receiving, at data processing hardware, a code insight request requesting a code insight for target source code from a developer device associated with a developer using the target source code to build a software development tool. The code insight request includes the target source code and a tool type indicator. The tool type indicator specifies that the software development tool includes one of a code labeling type of software development tool or a code transformation type software development tool. The method further includes obtaining, by the data processing hardware, a machine learning model based on the tool type indicator, the machine learning model trained on training source code associated with the specified one of the code labeling type of software development tool or the code transformation type of software development tool. The method further includes generating, by the data processing hardware, the code insight for the target source code using the machine learning model. When the tool type indicator specifies that the software development tool includes the code labeling type of software development tool, the code insight for the target source code includes a predicted label for the target source code. When the tool type indicator specifies that the software development tool includes the code transformation type of software development tool, the code insight for the target source code includes a predicted code transformation for the training source code. The method further includes transmitting, by the data processing hardware, the code insight to the developer device, the code insight when received by the developer device causing a graphical user interface executing on the developer device to display the code insight on a display screen of the developer device.

Implementations of the disclosure may include one or more of the following optional features. In some implementations, the method further includes extracting, by the data processing hardware, a set of target features from the target source code, the set of target features corresponding to a syntactic representation of the target source code that is suitable for input to the machine learning model. In these implementations, the machine learning model is configured to receive the set of target features as input and generate the code insight for the target source code as output. The syntactic representation of the target source code may include an Abstract Syntax Tree (AST). In some examples, obtaining the machine learning model includes generating the machine learning model in response to receiving the code insight request by training, using a machine learning model generator, the machine learning model on selected training source code. The training source code may be selected from a source code repository stored on memory hardware in communication with the data processing hardware, the training source code associated with the specified one of the code labeling type of software development tool or the code transformation type of software development tool. In some implementations, the method further includes extracting, by the data processing hardware, a set of training features from the selected training source code, the set of training features corresponding to a syntactic representation of the training source code that is suitable for training the machine learning model. The syntactic representation of the training source code may include an Abstract Syntax Tree (AST).

In some implementations, the code insight request further includes an outcome characteristic type associated with the code insight and defined by the developer, and obtaining the machine learning model based on the tool type indicator may be further based on the outcome characteristic type. In these implementations, generating the code insight for the target source code using the machine learning model may further include generating an emulated outcome characteristic for the code insight using the machine learning model, the emulated outcome characteristic associated with the outcome characteristic type of the code insight request. The method may further include identifying, by the data processing hardware, from a source code repository stored on memory hardware in communication with the data processing hardware, training examples of the training source code paired with a corresponding outcome characteristic associated with the outcome characteristic type of the code insight request. The method may further include training, by the data processing hardware, the machine learning model on the training examples including the training source code paired with the corresponding outcome characteristic.

The emulated outcome characteristic for the code insight may include one of an emulated build result for the target source code or a transformation of the target source code, an emulated elapsed time period for running the target source code or the transformation of the target source code, emulated metadata for the target source code or the transformation of the target source code, or an emulated human-generated comment for the target source code or the transformation of the target source code. The method may further include, when the predicted code transformation for the target source code includes executable code, training, by the data processing hardware, the machine learning model on training examples including the training source code paired with corresponding training executable code resulting from compiling or interpreting the training source code. In some implementations, generating the code insight for the target source code using the machine learning model includes: generating, using the machine learning model, a vector representation for the target source code using the machine learning model configured to receive a set of target features extracted from the target source code as feature inputs; determining similarity scores for a pool of training source code snippets stored in memory hardware in communication with the data processing hardware, each similarity score associated with a corresponding training code snippet and indicating a level of similarity between the vector representation for the target source code and a respective vector representation for the corresponding training code snippet; and identifying one or more training source code snippets from the pool of training source code snippets that have similarity scores satisfying a similarity threshold as corresponding to mutations of the target source code.

The target source code may include a pair of target source code snippets from a target codebase and generating the code insight for the target source code using the machine learning model may include, for each target source code snippet in the pair of target source code snippets, generating a vector representation for the corresponding target source code snippet using the machine learning model configured to receive a set of target features extracted from the corresponding target source code snippet as feature inputs, determining a vector-space distance between the pair of target source code snippets based on the vector representation, and determining the pair of target source code snippets are duplicates of one another when the vector-space distance satisfies a distance threshold. The predicted label for the training source code may include at least one of a predicted level of complexity of the target source code, a predicted quality of the target source code, a predicted testing requirement for the target source code, or a predicted difficulty rating of the target source code. The predicted code transformation for the target source code may include at least one of updated target source code fixing a build error in the target source code, executable code for the target source code, a revision to the target source code, or suggested replacement source code for replacing the target source code.

Another aspect of the disclosure provides a system for generating code insights. The system includes data processing hardware and memory hardware in communication with the data processing hardware and storing instructions that when executed on the data processing hardware cause the data processing hardware to perform operations. The operations include receiving a code insight request requesting a code insight for target source code from a developer device associated with a developer using the target source code to build a software development tool. The code insight request includes the target source code and a tool type indicator. The tool type indicator specifies that the software development tool includes one of a code labeling type of software development tool or a code transformation type software development tool. The operations further include obtaining a machine learning model based on the tool type indicator, the machine learning model trained on training source code associated with the specified one of the code labeling type of software development tool or the code transformation type of software development tool. The operations further include generating the code insight for the target source code using the machine learning model. When the tool type indicator specifies that the software development tool includes the code labeling type of software development tool, the code insight for the target source code includes a predicted label for the target source code. When the tool type indicator specifies that the software development tool includes the code transformation type of software development tool, the code insight for the target source code includes a predicted code transformation for the training source code. The operations further include transmitting the code insight to the developer device, the code insight when received by the developer device causing a graphical user interface executing on the developer device to display the code insight on a display screen of the developer device.

Implementations of the disclosure may include one or more of the following optional features. In some implementations, the operations further include extracting a set of target features from the target source code, the set of target features corresponding to a syntactic representation of the target source code that is suitable for input to the machine learning model. In these implementations, the machine learning model is configured to receive the set of target features as input and generate the code insight for the target source code as output. The syntactic representation of the target source code may include an Abstract Syntax Tree (AST). In some examples, obtaining the machine learning model includes generating the machine learning model in response to receiving the code insight request by training, using a machine learning model generator, the machine learning model on selected training source code. The training source code may be selected from a source code repository stored on memory hardware in communication with the data processing hardware, the training source code associated with the specified one of the code labeling type of software development tool or the code transformation type of software development tool. In some implementations, the operations further include extracting a set of training features from the selected training source code, the set of training features corresponding to a syntactic representation of the training source code that is suitable for training the machine learning model. The syntactic representation of the training source code may include an Abstract Syntax Tree (AST).

In some implementations, the code insight request further includes an outcome characteristic type associated with the code insight and defined by the developer, and obtaining the machine learning model based on the tool type indicator may be further based on the outcome characteristic type. In these implementations, generating the code insight for the target source code using the machine learning model may further include generating an emulated outcome characteristic for the code insight using the machine learning model, the emulated outcome characteristic associated with the outcome characteristic type of the code insight request. The operations may further include identifying, from a source code repository stored on the memory hardware, training examples of the training source code paired with a corresponding outcome characteristic associated with the outcome characteristic type of the code insight request. The operations may further include training the machine learning model on the training examples including the training source code paired with the corresponding outcome characteristic.

The emulated outcome characteristic for the code insight may include one of an emulated build result for the target source code or a transformation of the target source code, an emulated elapsed time period for running the target source code or the transformation of the target source code, emulated metadata for the target source code or the transformation of the target source code, or an emulated human-generated comment for the target source code or the transformation of the target source code. The operations may further include, when the predicted code transformation for the target source code includes executable code, training the machine learning model on training examples including the training source code paired with corresponding training executable code resulting from compiling or interpreting the training source code. In some implementations, generating the code insight for the target source code using the machine learning model includes generating a vector representation for the target source code using the machine learning model configured to receive a set of target features extracted from the target source code as feature inputs, determining similarity scores for a pool of training source code snippets stored in the memory hardware, each similarity score associated with a corresponding training code snippet and indicating a level of similarity between the vector representation for the target source code and a respective vector representation for the corresponding training code snippet, and identifying one or more training source code snippets from the pool of training source code snippets that have similarity scores satisfying a similarity threshold as corresponding to mutations of the target source code.

The target source code may include a pair of target source code snippets from a target codebase and generating the code insight for the target source code using the machine learning model may include, for each target source code snippet in the pair of target source code snippets, generating a vector representation for the corresponding target source code snippet using the machine learning model configured to receive a set of target features extracted from the corresponding target source code snippet as feature inputs, determining a vector-space distance between the pair of target source code snippets based on the vector representation, and determining the pair of target source code snippets are duplicates of one another when the vector-space distance satisfies a distance threshold. The predicted label for the training source code may include at least one of a predicted level of complexity of the target source code, a predicted quality of the target source code, a predicted testing requirement for the target source code, or a predicted difficulty rating of the target source code. The predicted code transformation for the target source code may include at least one of updated target source code fixing a build error in the target source code, executable code for the target source code, a revision to the target source code, or suggested replacement source code for replacing the target source code.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Aspects of the present disclosure relate to machine learning models for software development tools. Software developers use software development tools to create, debug, maintain, or otherwise support software applications, websites, or other software systems or components. Software development tools may be discrete programs, executed separately—e.g., from a command interpreter—or may be parts of a single large program, often called an integrated development environment (IDE). In order to find bugs in programs, prevent creating new bugs when extending an application, and to generally follow accepted programming practices, codebase-aware software development tools may be used. The codebase (or code base) is a collection of source code used to build the particular software system or software component (e.g., a software development tool). The codebase is typically stored in a source code repository. The codebase generally includes human-written source code snippets. Due to the high complexity or just shear length of these source code snippets, it is often impossible for even the most experienced software developer to manually inspect the source code snippets simply by glancing at the codebase. Abstractions provided by high-level programming languages also make it even more difficult to understand the connection between source code and the software application's behavior. In order to find bugs in programs, prevent creating new bugs when extending code, and to generally follow accepted programming practices, software developers may leverage machine learning models when building software development tools that operate on source code.

Software analyzers typically work by applying rules to assess the source code. The rules may be language-specific and/or operating-system-specific, based on common causes of programming errors. Rules with too little precision may result in too many false-positive indications to be useful to software developers. Rules with excess precision might be applicable only in limited circumstances and/or take too long to execute to be practical. Software development tools based on machine learning models may efficiently achieve an appropriate balance between avoiding false-positive indications and practical execution times. Software development tools based on machine learning models may go beyond detecting common programming errors. Machine learning models, trained using exemplary codebases, may be able to gain insights based on the exemplary codebase and/or features extracted from the exemplary codebase.

While machine learning models that understand source code are able to drastically reduce the time to build software development tools and improve an overall quality thereof, producing machine learning models tailored for building a specific software development tools is an arduous process and requires specialized engineers knowledgeable in machine learning. Moreover, the skills and knowledge required for producing machine learning models and for producing software development tools on source code do not typically overlap, thereby requiring separate engineers specialized in machine learning and software development tools. Often the advantages that machine learning models provide for optimizing the building of software development tools does not outweigh the additional costs and resources required for producing the machine learning models. As a result, it is often easier to build the software development tool the conventional way without using machine learning models.

Implementations herein are directed toward automatically generating a machine learning model for use in generating a code insight for target source code a developer is using to build a software development tool. By generating a machine learning model that understands target source code, the developer is alleviated from all aspects of the process for producing the machine learning model, such as data collection and having specialized skill and knowledge in producing machine learning models. For instance, the developer may provide a code insight request requesting a code insight for target source code in which the code insight request includes the target source code and a tool type indicator specifying that the software development tool includes one of a code labeling type of software development tool (e.g., a tool that provides a difficulty rating) or a code transformation type of software development tool (e.g., a tool that takes code as input and produces different code as output). The code insight request may optionally include an output characteristic type associated with the code insight, such as, without limitation, build results, an elapsed period of time for running the target source code, metadata for the target source code, or human-generated comments for the target source code. Essentially, the output characteristic type is defined by the developer and provides a hint as to which type of data is relevant to the software development tool being built.

Based on the tool type indicator, and optionally the output characteristic type, a machine learning system is configured to automatically collect and join related to training source code data to build the machine learning model for learning how to generate the code insight. That is, once the machine learning model is trained on the training source code, the developer can provide the target source code (e.g., source code snippet(s)) as input to the trained machine learning model and the trained machine learning model can generate the code insight for the target source code. Here, the code insight includes one of a predicted label for the target source code when the tool type indicator specifies that the software development tool comprises the code labeling type of software development tool; or a predicted code transformation for the training source code when the tool type indicator specifies that the software development tool corresponds to the code transformation type of software building tool. The developer may view the code insight (e.g., via display on a graphical user interface) and update the target source code as necessary based on the code insight.

Figure 1:
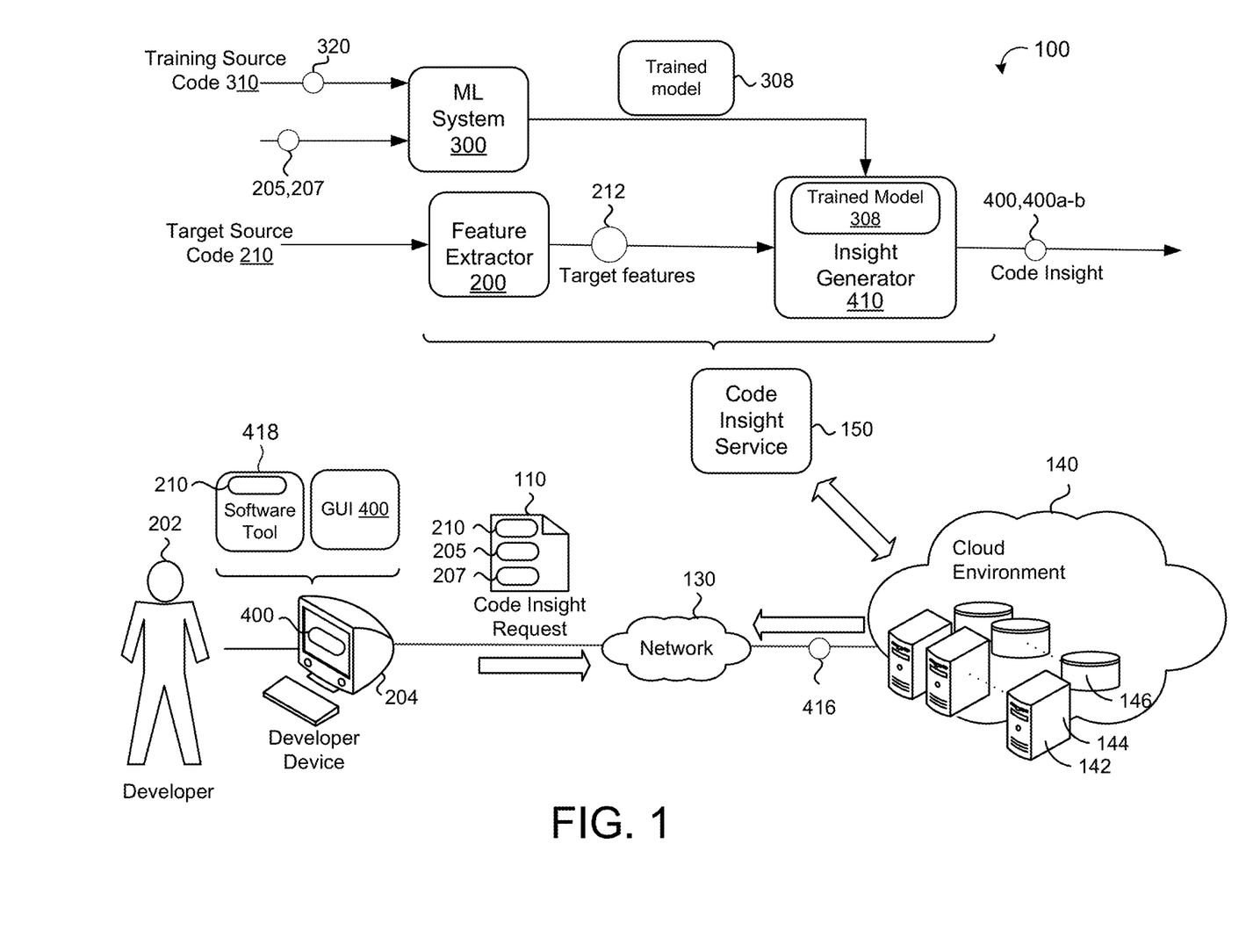
FIG. 1 is a schematic view of an example environment for training machine learning models for use in software development tools.

Referring to FIG. 1, in some implementations, a system 100 includes a developer device 204 associated with a software developer 202, who may communicate, e.g., via a network 130, with a remote system 140. The remote system 140 may be a distributed system (e.g., cloud environment) having scalable/elastic resources 142. The resources 142 include computing resources (e.g., data processing hardware) 144 and/or storage resources (e.g., memory hardware) 146. The software developer 202 may use the developer device 204 to build a software development tool (e.g., software tool) 418 that operates on target source code 210. The remote system 140 executes a code insight service 150 for automatically obtaining a machine learning model 308 and using the machine learning model 308 to generate a code insight 400, 400a-b for the target source code 210 the developer 202 is using to build the software tool 418. As opposed to conventional techniques that require the software developer 202 to manually collect all the necessary data and undertake the arduous process to build a machine learning model specifically tailored for analyzing the target source code, the code insight service 150 is configured to automatically obtain (e.g., automatically generate) the machine learning model 308 without input from the developer 202 except for the target source code 210 and a tool type indicator 205 specifying that the tool 418 includes one of a code labeling type of software development tool or a code transformation type of software development tool. To obtain/generate an even more robust machine learning model 300, the developer 202 may additionally provide an outcome characteristic type 207 associated with the code insight 400.

The developer device 202 may execute a graphical user interface (GUI) 220 for display on a screen of the developer device 202. The developer 204 may use the GUI 204 to build the software tool 418 that operates on the target source code 210. For instance, the developer 204 may input the target source code 210 to the developer device 202 via the GUI 204. The developer 204 may use the GUI 220 to communicate with the code insight service 150, e.g., to send code insight requests 110 to the code insight service 150 and display code insights 400 generated by the code insight service 150.

In the example shown, the code insight service 150 receives a code insight request 110 requesting the code insight 400 for target source code 210 used to build the software development tool 418. The target source code 210 may include one or more source code snippets in a codebase that the developer 204 is seeking to gain insights on, e.g., via the code insight 400. The code insight request 110 includes the target source code 210 and a build type indicator 205 specifying that the software development tool 418 includes one of a code labeling type of software development tool or a code transformation type of software development tool. In additional examples, the code insight request 110 further includes an output characteristic type 207 associated with the code insight 400, such as, without limitation, build results, an elapsed period of time for running the target source code, metadata for the target source code, or human-generated comments for the target source code. Essentially, the output characteristic type 207 is defined by the developer 202 and provides a hint as to which type of data is relevant to the software development tool 418 being built, and at a more granular level, provides a hint as to which type of data is relevant for obtaining/generating the machine learning model 308 for use in generating the code insight 400.

In some implementations, the code insight service 150 executing on the remote system 140 (e.g., executing on the data processing hardware 144) includes a feature extractor 200, a machine learning (ML) system 300, and an insight generator 410. In the example shown, the feature extractor 200 is configured to extract a set of target features 212 from the target source code 210 included in the code insight request 110 received from the developer device 204. Here, the set of target features 212 correspond to a syntactic representation of the target source code 210 that is suitable for input to the machine learning model 308. For instance, the use of the target features 212 to syntactically represent the target source code 210 can represent the target source code 210 in a format that is readable by the machine learning model 308 and reduce memory requirements of the machine learning model 308 by unnecessary data from the target source code 210. In some examples, the syntactic representation of the target source code 210 include an abstract syntax tree (AST).

Figure 2:
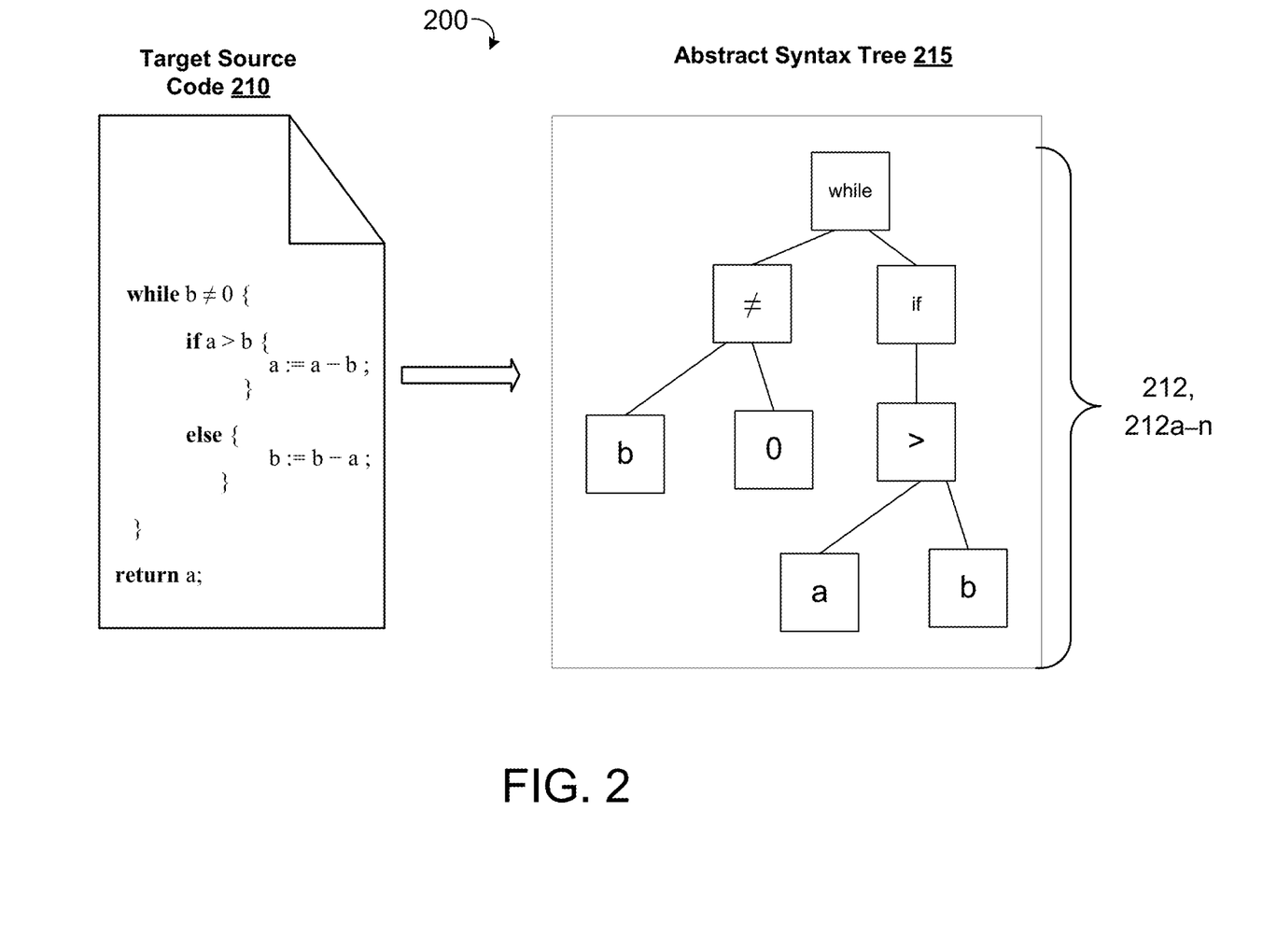
FIG. 2 is a schematic view of an example set of target features extracted from the target source code.

FIG. 2 shows an example feature extractor 200 extracting the set of target features 212 from the target source code 210 into an Abstract Syntax Tree (AST) representation 215. The same or different feature extractor 200 may extract training features from training source code 210 into AST representations 215 as well. The feature extractor 200 may also be used to extract different features from the target source code 210 to provide other types of syntactic representations of the target source code 210. While FIG. 1 shows the feature extractor 200 executing on the remote system 140, the developer device 204 may execute the feature extractor 200 in other configurations. Generally, the target source code 210 includes software expressed in a high-level, structured computer language. For instance, the target source code 210 may include software expressed in high-level, structured computer languages having defined syntax, including, but not limited to, Java, JavaScript, Python, Ruby, C/C++, C#, Objective-C, SQL, PHP, and/or R. Inserting the target source code 210 straight into a machine learning model 308 would produce results of such poor quality, such that the results would be unusable. Additionally, it would require vastly more resources than available. The feature extractor 200, however, may extract the set of target features 212 into the AST representation 215 by hashing pairs of nodes and their common ancestor to obtain the same or better results, and at the same time, substantially reduce the memory requirements. The AST representation 215 may represent the structural or content-related features 212 of the target source code 210. For instance, the AST representation 215 may omit punctuation and delimiters such as braces, semicolons, parentheses, etc. that define the structure of the target source code 210. FIG. 2 shows a snippet of the target source code 210. The snippet includes a while loop, an if/then/else statement, and two assignment statements. A portion of the target features 212 based on the AST representation 215 is also shown. The AST representation 215 omits the braces and semicolons of the code snippet, while retaining the syntactic features 212 of the target source code 210 arranged in a hierarchical tree format. In this example, each box in the tree structure represents a feature 212, 212a-n extracted from the target source code 210.

In some examples, the AST representation 215 corresponds to a particular computer language. In other examples, the AST representation 215 broadly applies to several programming languages, thereby enabling training of the machine learning model 308 on programming-language-agnostic AST representation of the training source code 310 such that the machine learning model 308 may learn to recognize compliance with an established naming standard in the target source code 210 expressed in a number of programming languages, e.g. Java or Python.

Referring back to FIG. 1, in some implementations, the ML system 300 is configured to obtain the machine learning model 308 based on the tool type indicator 205 included in the code insight request 110 received from the developer device 204. In examples when the code insight request 110 also includes the output characteristic type 207 associated with the code insight 400, the ML system 300 is configured to obtain the machine learning model 308 based on both the tool type indicator 205 and the output characteristic type 207. Described in greater detail below with reference to FIG. 3, the ML system 300 uses the tool type indicator 205 and the output characteristic type 207 to collect relevant data for generating the machine learning model 308. More specifically, the ML system 300 uses the tool type indicator 205 to select training source code 310 associated with the one of the code labeling type of software development tool or the code transformation type of software development tool specified by the tool type indicator 205. The ML system 300 may further use the output characteristic type 207 to identify training examples of the training source code 310 paired with a corresponding outcome characteristic 320 associated with the outcome characteristic type 207. In the example shown, the ML system 300 trains the machine learning model 308 on the training source code 310 or the training examples that include the training source code 310 paired with the corresponding outcome characteristic 320.

After the ML system 300 obtains the machine learning model 308 responsive to receiving the code insight request 110 from the developer device 204, the insight generator 410 is configured to generate the code insight 400 for the target source code 210 using the machine learning model 308. In some examples, the insight generator 410 receives the set of target features 212 extracted from the target source code 210 as input to the model 308 and generates the code insight 400 for the target source code 210 as output. However, in other examples, the code insight server 150 may omit the feature extractor 200 and instead generate the code insight 400 from the target source code 210 as input.

When the tool type indicator 205 specifies that the software development tool 418 includes the code labeling type of software development tool, the code insight 400 includes a predicted label 400a for the target source code 210. For instance, the predicted label 400a may include at least one of a predicted level of complexity (e.g., complex vs. simple) of the target source code 210, a predicted quality of the target source code (e.g., good code vs. bad code); a predicted testing requirement for the target source code (e.g., better if tested); or a predicted difficulty rating of the target source code. The predicted label 400a may include any type of label the developer 202 wants the machine learning model 308 to predict for the target source code 210. Further, the tool type indicator 205 included in the code insight request 110 may specify the code labeling type when developer 202 specifies, when providing the code insight request 110, a specific label the developer 202 wants the machine learning model 308 to predict. That is, the code insight request 110 may indicate that the developer 202 wants the code insight service 150 (e.g., via the machine learning model 308) to predict the complexity of the target source code 210, the quality of the target source code 210, the testing requirement for the target source code 210, or the difficulty rating of the target source code 210.

On the other hand, when the tool type indicator 205 specifies that the software development tool 418 includes the code transformation type of software development tool, the code insight 400 includes a predicted code transformation 400b for the target source code 210. In some examples, the machine learning model 308 is configured to operate as a build error fixer in which the model 308 identifies one or more build errors in the target source code 210 (e.g., in the target features 212) and generates a predicted code transformation 400b that fixes the identified one or more build errors. Here, the predicted code transformation 400b may include updated target source code 210 fixing the build errors or may include code revisions for fixing portions of code that resulted in the build errors. In additional examples, the predicted code transformation 400b includes executable code output that emulates compiling/interpreting the target source code 210. In some implementations, the predicted code transformation 400b includes suggested replacement code for replacing the target source code 210.

In scenarios when the code insight request 110 includes the outcome characteristic type 207 specified by the developer 202, the insight generator 410 is further configured to generate an emulated outcome characteristic 320 for the code insight 400 using the machine learning model 308. In these scenarios, the emulated outcome attribute 320 is associated with the outcome characteristic type 207 included in the code insight request 110. For instance, the emulated outcome attribute 320 may include an emulated build result indicating whether the build for the target source code 210 will be successful or will fail. The emulated outcome attribute 320 may additionally or alternatively include an emulated elapsed time period for running the target source code and/or emulated metadata for the target source code. In some examples, when the outcome characteristic type 207 specifies user comments, the emulated outcome attribute 320 includes an emulated human-generated comment for the target source code 210 that emulates user comments that would result from a code review of the target source code 210.

Figure 3:
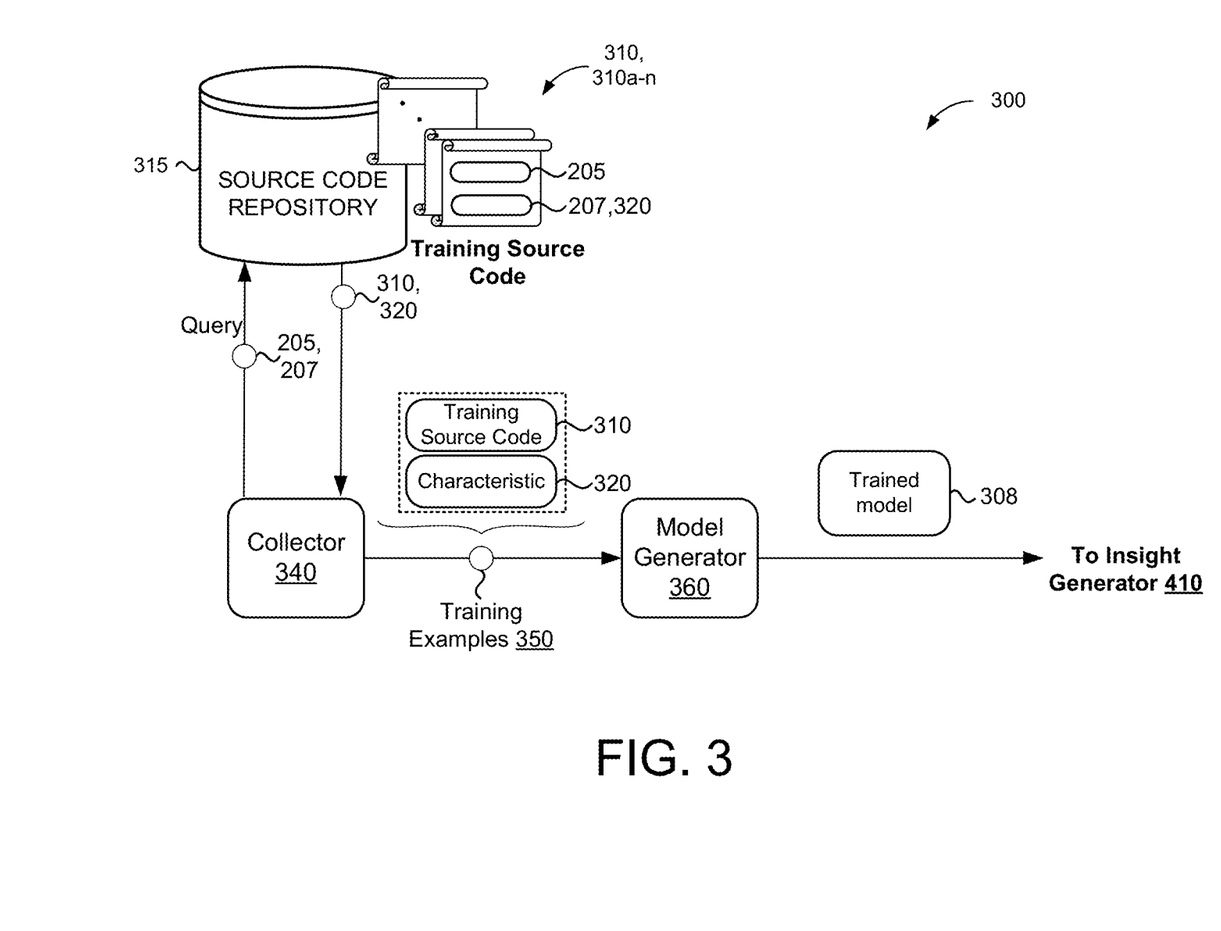
FIG. 3 is a schematic view of an example of training a machine learning model for software development tools.

FIG. 3 shows an example of the machine learning (ML) system 300 of the code insight service 150 executing on the remote system 140. The ML system 300 may include a data collector 340, a machine learning model generator 360, and a source code repository 315 stored on the memory hardware 146 of the remote system 140. In the example shown, the source code repository 315 may include a codebase of training source code 310, 310a-n that the model generator 360 may use for generating (i.e., training) a trained ML model 308 for learning to predict labels 400a or code transformations 400b for target source code 210. In some examples, the source code repository 315 also contains snippets of target source code 210 that the developer device 204 may access for building the software development tool 418 and included in code insight requests 110 to the code insight service 150. Based on a build type indicator 205 (and optionally the output characteristic type 207) provided in a code insight request 110 received by the code insight service 150, the data collector 340 may query the source code repository 315 to select training source code 310 associated with the specified one of the code labeling type of software development tool or the code transformation type of software development tool. Thereafter, the model generator 360 uses the training source code 310 selected by the data collector 340 as training examples 350 for training the machine learning model 308. Thus, the ML system 300 may generate the machine learning model 308 in response to receiving the code insight request 110 by selecting the training source code 310 from the source code repository 315 and training, using the machine learning model generator 360, the machine learning model 308 on the selected training source code 310.

The data collector 340 may collect other relevant data that is necessary for building/producing the machine learning model 308 specifically tailored for generating a developer-defined code insight 400 for a software development tool 418 operating on target source code 210. The model generator 360 corresponds to a machine learning system based on neural networks, such as deep learning neural networks).

The model generator 360 may implement generalized back-propagation to generate a neural network for training the machine learning model 308.

In some implementations, the ML system 300 extracts a set of training features from the selected training source code 310 to provide a syntactic representation of the training source code 310 that is suitable (e.g., readable and reduce memory requirements) for training the machine learning model 308. For instance, the ML system 300 may employ the feature extractor 200 as discussed above with reference to FIGS. 1 and 2. In some examples, the syntactic representation of the training source code 210 includes the AST representation 215 (FIG. 2).

When the code insight request 110 also includes the outcome characteristic type 207 associated with the code insight 400, the data collector 340 may identify/select, from the source code repository 315, training examples 350 of the training source code 310 paired with a corresponding outcome characteristic 320 associated with the outcome characteristic type 207 of the code insight request 110. Here, the model generator 360 may train the machine learning model 308 on the training examples of the training source code 310 paired with the corresponding outcome characteristic 320. By providing the developer-defined outcome characteristic type 207, the pool of training source code 310 used to train the machine learning model 308 may be refined and/or the model generator 360 may adjust weights of the neural network to give more preference to training source code 310 paired with a specific outcome characteristic 320 that matches the developer-defined outcome characteristic type 207. In some examples, the outcome characteristic type 207 is determined based on a code insight 400 the developer 202 wants to know. For instance, the developer 202 may request (e.g., in a code insight request 110) the code insight service 150 to determine whether some target source code 210 will build successfully. In this scenario, the outcome characteristic type 207 may indicate that training source code 310 paired with "build results" is highly relevant for use in training the machine learning model 308.

Each snippet of training source code 310 stored in the source code repository 315 may be labeled with one or more outcome characteristics 320 associated with the training source code 310. These outcome characteristics 320 may include, without limitation, corresponding build results for the code 310, an elapsed time period to run the code 310, metadata for the code 310, or human-generated comments (e.g., user comments) based on a review cycle of the code 310. In some examples, an outcome characteristic 320 for training source code 310 includes corresponding executable code resulting from compiling/interpreting the training source code 310.

In examples when the developer 202 requests (e.g. in the code insight request 110) the code insight service 150 to generate a predicted code transformation 400b that includes an executable code output to emulate compiling/interpreting the target source code 210, the model generator 360 may train the machine learning model 308 on training examples 350 including training source code 310 paired with corresponding training executable code resulting from compiling or interpreting the training source code. Here, the training executable code may correspond to an outcome characteristic 320 associated with the training source code 310. Accordingly, the data collector 340 may query the source code repository 315 to select/identify the training source code 310 paired with corresponding training executable code as training examples 350 for the model generator 360 to use for training the machine learning model 308.

When the build type indicator 205 in the code insight request 110 specifies the labeling type of software development tool, the model generator 360 may train the machine learning model 308 on both positive and negative training examples 350. For instance, suppose the developer 202 requests the code insight service 150 to generate a predicted label 400b to indicate whether target source code 210 is better if tested, the model generator 360 may train the model 308 on positive training examples 350 that include training source code 310 labeled as "better if tested" and negative training examples 350 that include training source code 310 labeled "testing not required". In this scenarios, the positive and negative training examples 350 train the model 308 to learn whether source code input to the model 308 is "better if tested". Similarly, requesting predicted labels 400a indicating whether code is simple/complex (or good/bad), would require the model generator 360 to train the model 308 on positive training examples that include training source code 310 labeled as simple (or good) and negative training examples that include training source code 310 labeled as complex (or bad) so that model 308 can learn whether source code input to the model 308 is simple or complex (or good or bad).

In some examples, the model generator 360 trains the model 308 to generate a corresponding vector representation for each training source code snippet in a pool of training source code snippets. The ML system 300 may store a vector-space map of all the vector representations in the memory hardware 146 that the insight generator 410 may access to identify training source code snippets in a "neighborhood" of target source code 210. For instance, and with reference to FIG. 1, the insight generator 410 may generate a vector representation for the target source code 210 using the machine learning model 308 configured to receive the set of target features 212 as feature inputs, determine similarity scores for the pool of training source code snippets stored in the memory hardware 146, and identify one or more of the training source code snippets that have similarity scores satisfying a similarity threshold as being "neighbors" of the target source code 210. These "neighbors" may be identified by the insight generator 410 as suggested replacement code (e.g., predicted code transformation 400b) for replacing the target source code 210, or in other examples, as possible mutations (e.g., predicted label 400a) of the target source code 210. In this example, each similarity score is associated with a corresponding training source code snippet and indicates a level of similarity between the vector representation for the target source code 210 and a respective vector representation for the corresponding training source code snippet. Similarly, the insight generator 410 may use the vector representation of the target source code 210 in the vector-space map to predict where the target source code 210 should be positioned in a codebase.

With continued reference to FIGS. 1 and 3, training the model 308 to generate vector representations can be used by the insight generator 410 to generate other types of code insights 400 as well. For instance, the developer 202 may send a code insight request 110 having target source code 210 that includes a pair of target source code snippets from a target codebase (e.g., stored on the developer device 204 or stored on the memory hardware 146). Here, the insight generator 410 may generate the code insight 400 for the target source code 210 by generating, for each target source code snippet of the pair of target source code snippets, a vector representation for the corresponding target source code snippet using the machine learning model configured to receive the set of target features 212 extracted from the corresponding target source code snippet as feature inputs. Subsequently, the insight generator 410 may determine a vector-space distance between the pair of target source code snippets based on the vector representations and determine the pair of target source code snippets are duplicates of one another when the vector-space distance satisfies a distance threshold. In this example, upon the developer device 204 receiving and display the code insight 400 for the developer 202 to view, the developer 202 may choose to delete one of the target code snippets from the target codebase to conserve storage requirements.

Figure 4A:
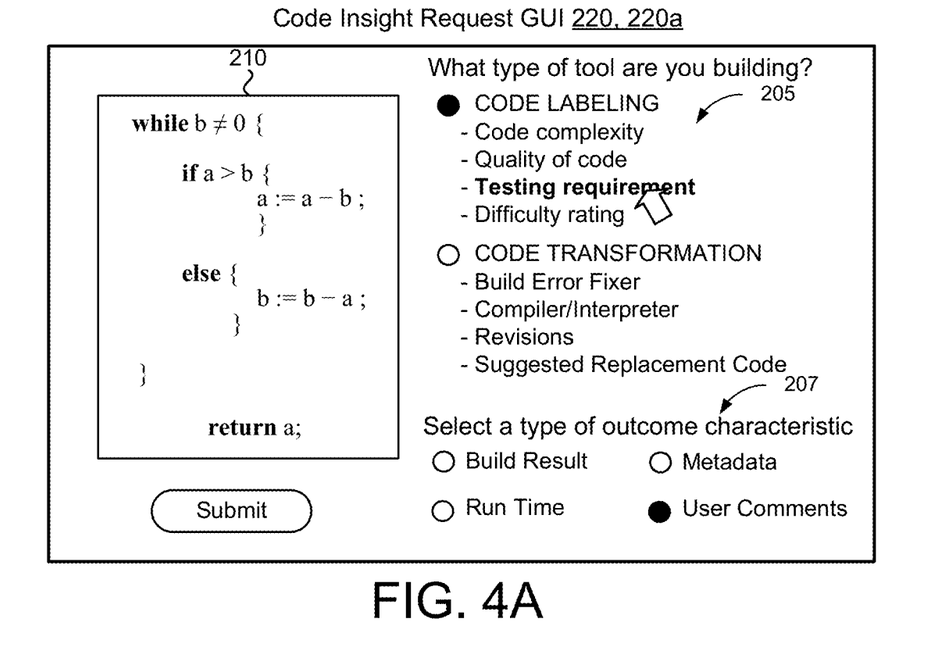
FIG. 4A-4D are schematic views of examples of executing a machine learning model used for software development.
Figure 4B:
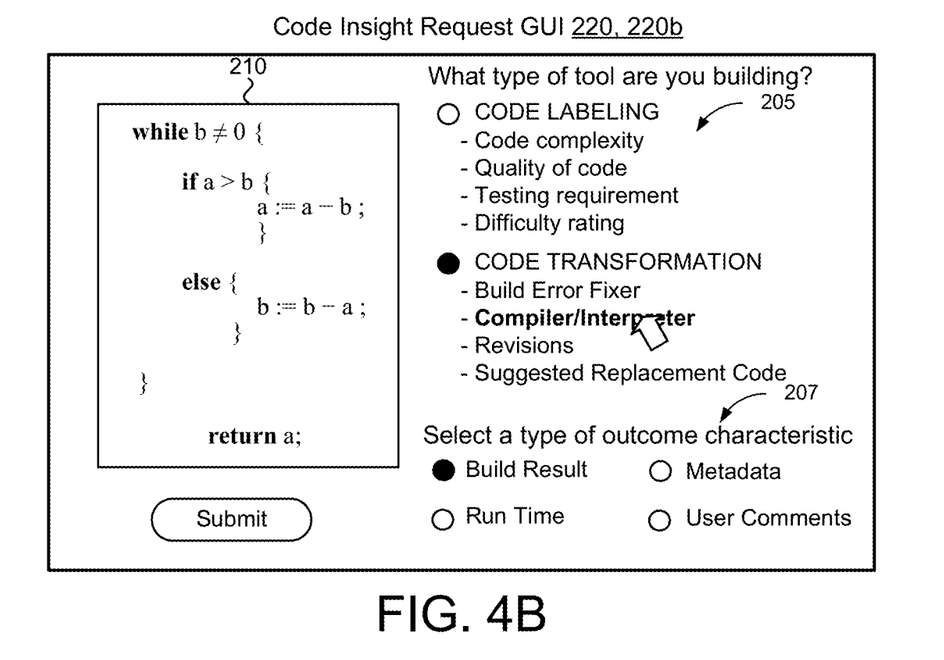

FIGS. 4A and 4B show example GUIs 220, 220a-b for allowing a developer to generate a code insight request 112 and submit the code insight request 112 to the code insight service 150 to request a code insight 400 for target source code 210. The developer 202 uses the GUI 220 to input the target source code 210. For instance, the developer 202 may manually input the target source code 210 or may obtain the target source code 212 from a codebase, e.g., the source code repository 315 (FIG. 3) or some other storage location. Each of the GUIs 220a, 220b prompt the developer 204 to specify what type of tool the developer is building by selecting a tool type indicator 205. For instance, FIG. 4A shows the GUI 220a receiving an input indication indicating selection of a code labeling type of software development tool. Here, the developer 202 may provide an input (e.g., via mouse cursor) requesting a "Testing requirement" label for the target source code 210 that causes the GUI 200a to select the tool type indicator 205 specifying the code labeling type of software development tool (e.g., via filling in circle for "Code Labeling"). On the other hand, FIG. 4B shows the GUI 200b receiving an input indication indicating selection of a code transformation type of software development tool, in which the developer 202 provides an input (e.g., via mouse cursor) requesting a "Compiler/Interpreter" transformation of the target source code 210 into executable code.

The code insight request GUIs 220a, 220b may also prompt the developer 202 to select an outcome characteristic type 207 associated with the code insight 400 for inclusion in the code insight request 110. While the examples of FIGS. 4A and 4B provide four options to select from for the output characteristic type 207, e.g., "Build Result", "Run Time", "Metadata", and "User Comments", the GUIs 220a, 220b can provide many more options and may further allow the developer 202 to speak or enter text the outcome characteristic type 207. FIG. 4A shows the GUI 220a receiving an input indication indicating selection of the "User Comments" output characteristic type 207 and FIG. 4B shows the GUI 220b receiving an input indication indicating selection of the "Build Result" output characteristic type 207. The GUIs 220a, 220b include a "Submit" button that when selected causes the developer device 202 to send the code insight request 110 to the code insight service 150, whereby the code insight request 110 includes the target source code 210, the tool type indicator 205 selected by the developer 202, and the output characteristic type 207 selected by the developer 202.

Figure 4C:
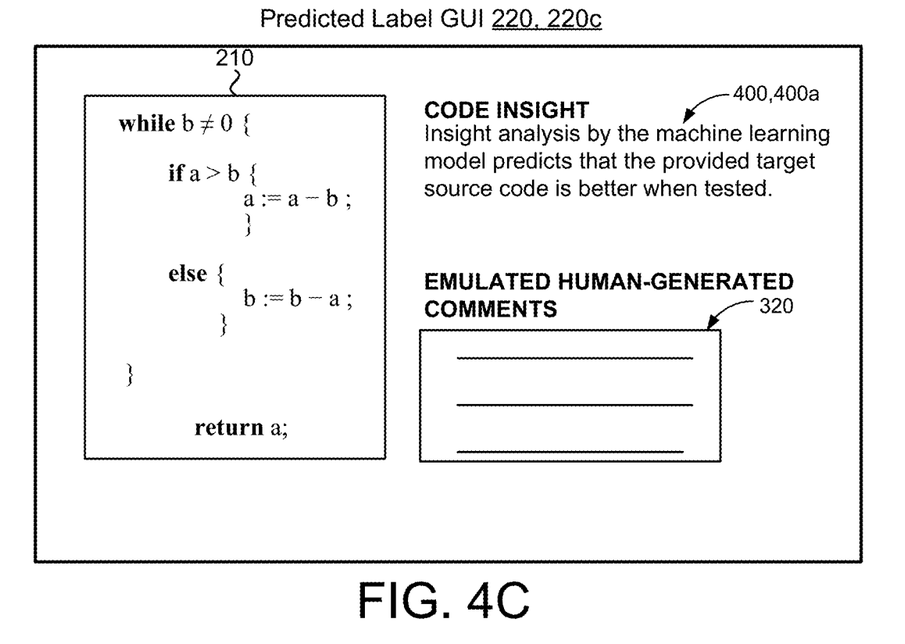
Figure 4D:
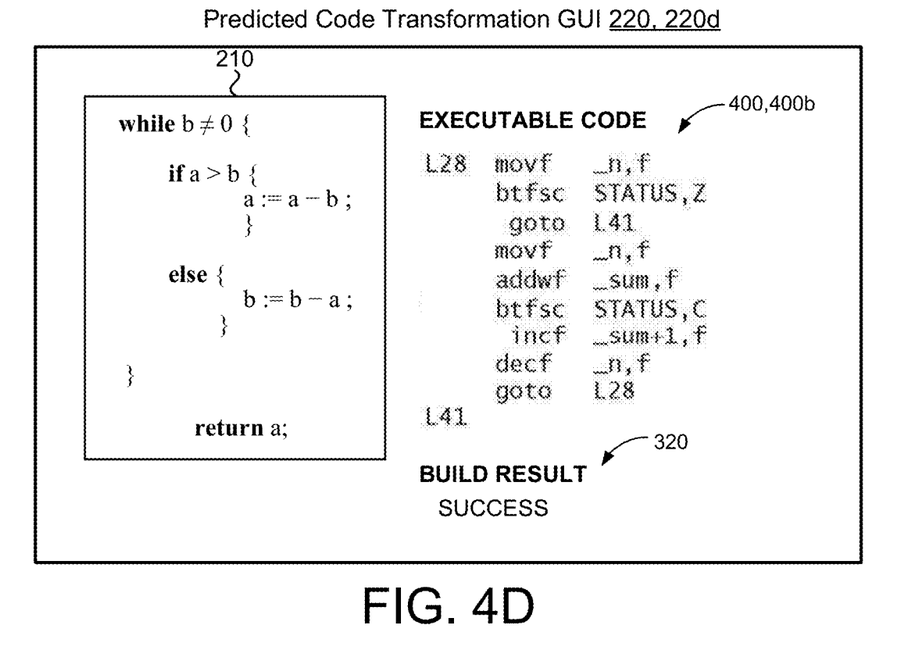

FIGS. 4C and 4D show example GUIs 220, 220c-d displaying code insights 400 generated by the code insight service 150 responsive to the code insight requests 110 generated using the GUIs 220a-b of FIGS. 4A and 4B. FIG. 4C shows the GUI 220c displaying a code insight 400 that includes a predicted label 400a for the target source code 210 included in the code insight request 110 sent by the developer 204 using the GUI 220a of FIG. 4A. Here, the predicted label 400a is generated for the target source code 210 since the tool type indicator 205 of the code insight request 110 specified that the software development tool 418 corresponds to the code labeling type of software development tool. In the example shown, the predicted label 400a indicates that the target source code 210 is "better when tested". Specifically, the predicted label 400a may provide a message notifying the developer that: "Insight analysis by the machine learning model predicts that the provided target source code is better when tested". FIG. 4C also shows the GUI 220c displaying an emulated outcome characteristic 320 for the code insight 400a, whereby the emulated outcome characteristic 320 is associated with the outcome characteristic type 207 of "User Comments" selected by the developer 202 via the GUI 220a of FIG. 4A for inclusion in the code insight request 110. In the example shown, the emulated outcome characteristic 320 includes emulated human-generated comments for the target source code 210. Accordingly, the developer 202 can ascertain what the human-generated comments would likely be for the target source code 210 during a review cycle.

FIG. 4D shows the GUI 220d displaying a code insight 400 that includes a predicted code transformation 400b for the target source code 210 included in the code insight request 110 sent by the developer 204 using the GUI 220b of FIG. 4B. Here, the predicted code transformation 400b is generated for the target source code 210 since the tool type indicator 205 of the code insight request 110 specified that the software development tool 418 corresponds to the code transformation type of software development tool. In the example shown, the predicted code transformation 400b includes executable code interpreted/compiled from the target source code 210. FIG. 4D also shows the GUI 220d displaying an emulated outcome characteristic 320 for the code insight 400b, whereby the emulated outcome characteristic 320 is associated with the outcome characteristic type 207 of "Build Results" selected by the developer 202 via the GUI 220b of FIG. 4B for inclusion in the code insight request 110. In the example shown, the emulated outcome characteristic 320 provides an emulated build result determination of "SUCCESS" for the target source code 210. Accordingly, the developer 202 can ascertain whether building the target source code 210 will likely be successful.

Figure 5:
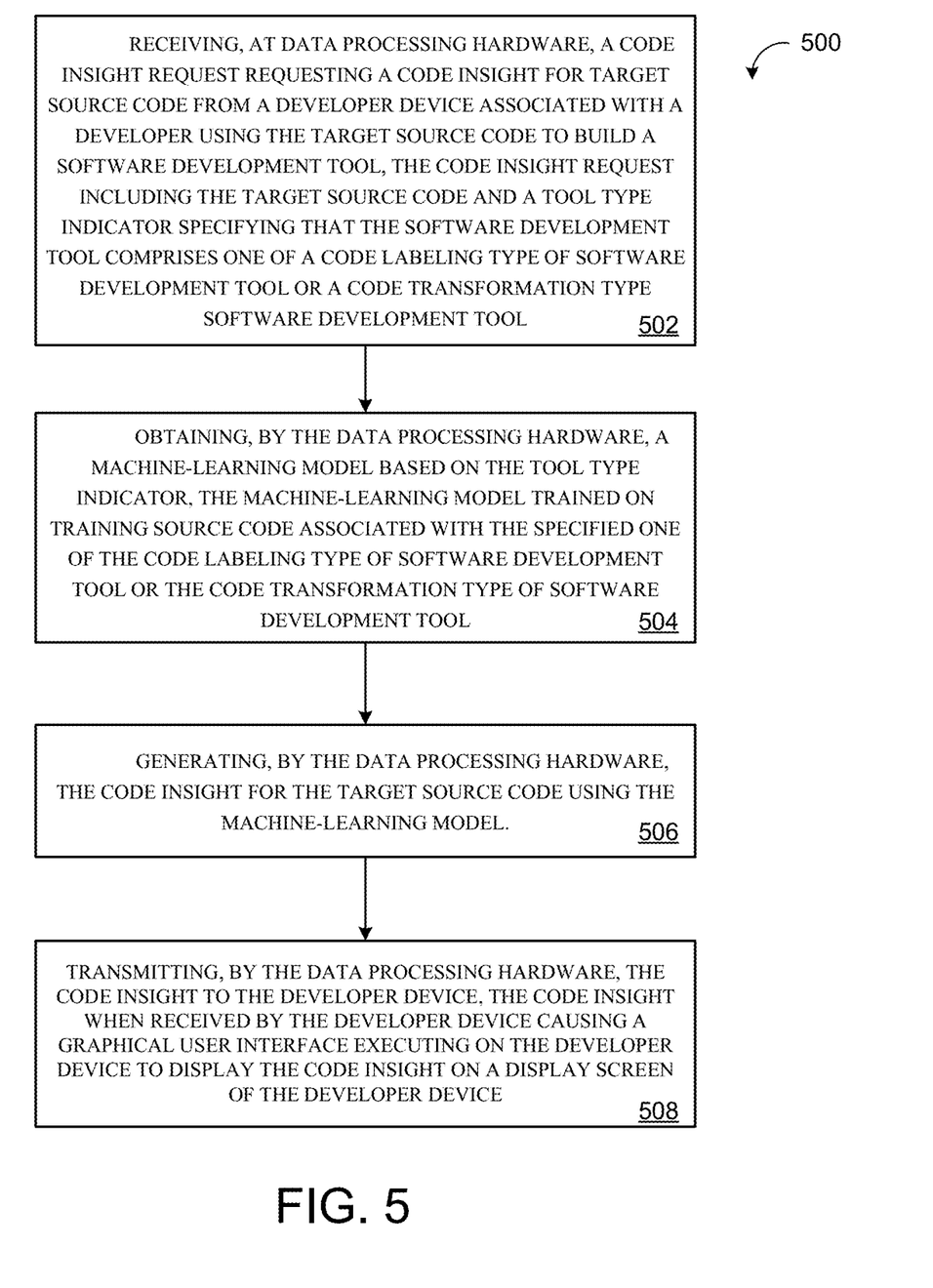
FIG. 5 is an example arrangement of operations for a method of applying a machine learning model to target source code.

FIG. 5 is a flowchart of an example arrangement of operations for a method of generating code insights 400. At operation 502, the method 500 includes receiving, at data processing hardware 144, a code insight request 112 requesting a code insight 400 for target source code 210 from a developer device 204 associated with a developer 202 using the target source code 210 to build a software development tool 418. The code insight request 112 includes the target source code 210 and a tool type indicator 205 specifying that the software development tool 418 includes one of a code labeling type of software development tool or a code transformation type software development tool. In some examples, the code insight request 112 further includes an outcome characteristic type 207 associated with the code insight 400. In these examples, the outcome characteristic type 207 is defined by the developer 202.

At operation 504, the method 500 includes obtaining, by the data processing hardware 144, a machine learning model 308 based on the tool type indicator 207. The machine learning model 308 is trained on training source code 310 associated with the specified one of the code labeling type of software development tool or the code transformation type of software development tool.

At operation 506, the method 500 includes generating, by the data processing hardware 144, the code insight 400 for the target source code 210 using the machine learning model 308. The code insight 400 for the target source code 210 includes one of a predicted label 400a for the target source code 210 when the tool type indicator 205 specifies that the software development tool 418 includes the code labeling type of software development tool, or a predicted code transformation 400b for the training source code 210 when the tool type indicator 205 specifies that the software development tool 418 corresponds to the code transformation type of software building tool. The predicted label 400a for the training source code 210 may include at least one of a predicted level of complexity of the target source code, a predicted quality of the target source code, a predicted testing requirement for the target source code, or a predicted difficulty rating of the target source code. The predicted code transformation for the target source code may include at least one of updated target source code fixing a build error in the target source code, executable for the target source code, a revision to the target source code, or suggested replacement source code for replacing the target source code At operation 508, the method 500 includes transmitting, by the data processing hardware 144, the code insight 400 to the developer device 204. The code insight 400 when received by the developer device 204 causes a graphical user interface 220 executing on the developer device 204 to display the code insight 400 on a display screen of the developer device 204.

Figure 6:
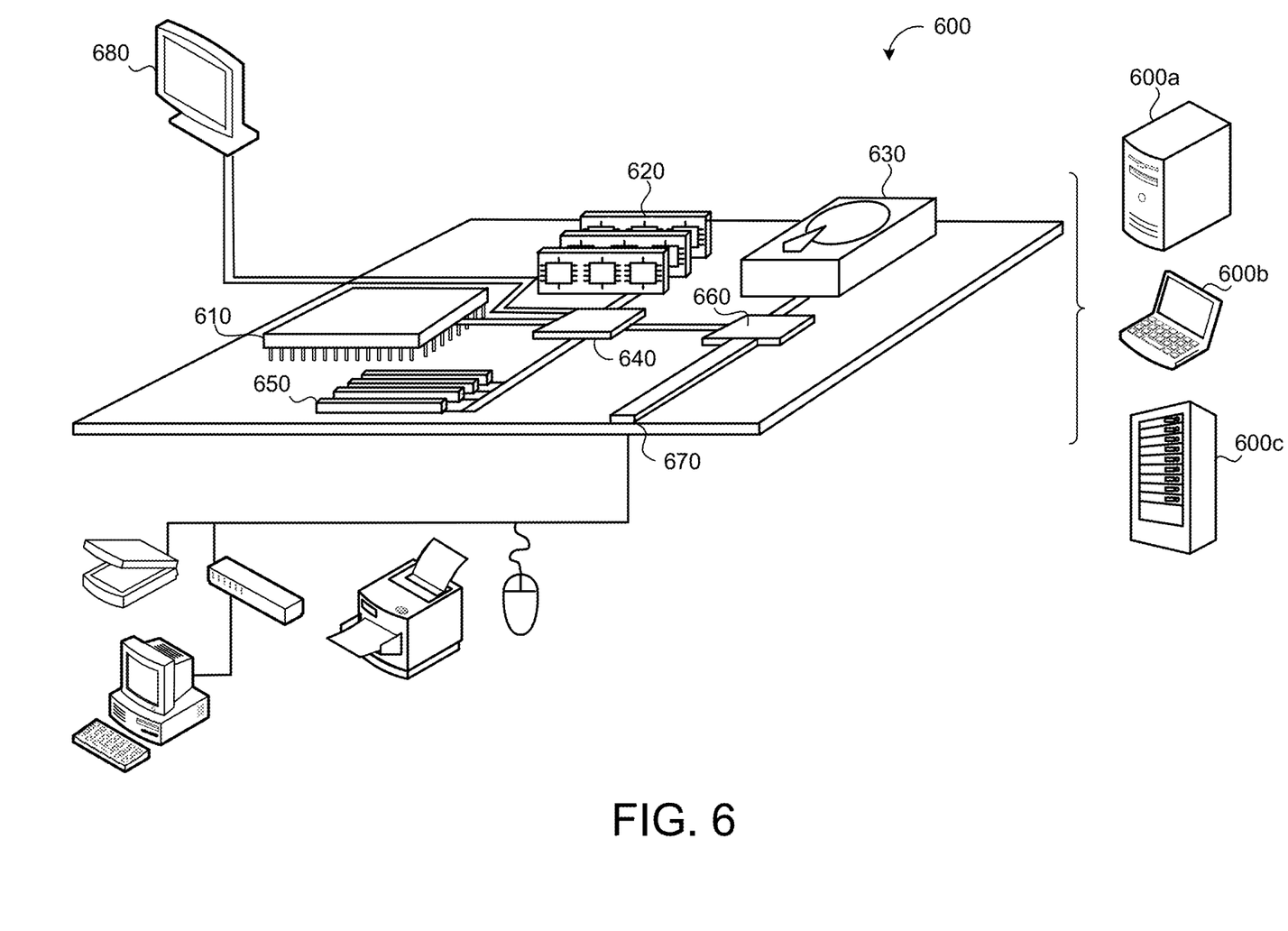
FIG. 6 is a schematic view of an exemplary computing device.

FIG. 6 is schematic view of an example computing device 600 that may be used to implement the systems and methods (e.g., the method 500) described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610 (also referred to as data processing hardware), memory 620 (also referred to as memory hardware), a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid-state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high-speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, a code insight request requesting a code insight for target source code from a developer device associated with a developer using the target source code to build a software development tool, the code insight request comprising:

the target source code, wherein the target source code comprises a pair of target source code snippets from a target codebase; and a tool type indicator specifying that the software development tool comprises one of a code labeling type of software development tool or a code transformation type of software development tool;

obtaining, by the data processing hardware, a machine learning model based on the tool type indicator, the machine learning model trained on training source code associated with the specified one of the code labeling type of software development tool or the code transformation type of software development tool;

generating, by the data processing hardware, the code insight for the target source code using the machine learning model, the code insight for the target source code comprising one of:

a predicted label for the target source code when the tool type indicator specifies that the software development tool comprises the code labeling type of software development tool; or a predicted code transformation for the target source code when the tool type indicator specifies that the software development tool comprises the code transformation type of software building tool; and transmitting, by the data processing hardware, the code insight to the developer device, the code insight when received by the developer device causing a graphical user interface executing on the developer device to display the code insight on a display screen of the developer device, wherein generating the code insight for the target source code using the machine learning model comprises:

for each target source code snippet in the pair of target source code snippets, generating a vector representation for the corresponding target source code snippet using the machine learning model configured to receive a set of target features extracted from the corresponding target source code snippet as feature inputs;

determining a vector-space distance between the pair of target source code snippets based on the vector representations; and determining the pair of target source code snippets are duplicates of one another when the vector-space distance satisfies a distance threshold.

2. The method of claim 1, further comprising:

extracting, by the data processing hardware, a set of target features from the target source code, the set of target features corresponding to a syntactic representation of the target source code that is suitable for input to the machine learning model, wherein the machine learning model is configured to:
receive the set of target features as input; and
generate the code insight for the target source code as output.

3. The method of claim 2, wherein the syntactic representation of the target source code comprises an abstract syntax tree.

4. The method of claim 1, wherein obtaining the machine learning model comprises generating the machine learning model in response to receiving the code insight request by:

selecting, from a source code repository stored on memory hardware in communication with the data processing hardware, the training source code associated with the specified one of the code labeling type of software development tool or the code transformation type of software development tool; and training, using a machine learning model generator, the machine learning model on the selected training source code.

5. The method of claim 4, further comprising extracting, by the data processing hardware, a set of training features from the selected training source code, the set of training features corresponding to a syntactic representation of the training source code that is suitable for training the machine learning model.

6. The method of claim 5, wherein the syntactic representation of the training source code comprises an abstract syntax tree.

7. The method of claim 1, further comprising:

identifying, by the data processing hardware, from a source code repository stored on memory hardware in communication with the data processing hardware, training examples of the training source code paired with human-generated comments based on a review cycle of the training source code; and training, by the data processing hardware, the machine learning model on the training examples comprising the training source code paired with the human-generated comments.

8. The method of claim 1, further comprising, when the predicted code transformation for the target source code comprises executable code, training, by the data processing hardware, the machine learning model on training examples comprising the training source code paired with corresponding training executable code resulting from compiling or interpreting the training source code.

9. The method of claim 1, wherein generating the code insight for the target source code using the machine learning model comprises:

determining similarity scores for a pool of training source code snippets stored in memory hardware in communication with the data processing hardware, each similarity score associated with a corresponding training source code snippet and indicating a level of similarity between the vector representation for the target source code and a respective vector representation for the corresponding training code snippet; and identifying one or more training source code snippets from the pool of training source code snippets that have similarity scores satisfying a similarity threshold as corresponding to mutations of the target source code.

10. The method of claim 1, wherein the predicted label for the training source code comprises at least one of:

a predicted level of complexity of the target source code;
a predicted quality of the target source code;
a predicted testing requirement for the target source code; or
a predicted difficulty rating of the target source code.

11. The method of claim 1, wherein the predicted code transformation for the target source code comprises at least one of:

updated target source code fixing a build error in the target source code;
executable code interpreted/compiled from the target source code;
a revision to the target source code; or
suggested replacement source code for replacing the target source code.

12. A system comprising:
data processing hardware; and memory hardware in communication with the data processing hardware and storing instructions that when executed on the data processing hardware cause the data processing hardware to perform operations comprising:
- receiving a code insight request requesting a code insight for target source code from a developer device associated with a developer using the target source code to build a software development tool, the code insight request comprising:
  - the target source code, wherein the target source code comprises a pair of target source code snippets from a target codebase; and
  - a tool type indicator specifying that the software development tool comprises one of a code labeling type of software development tool or a code transformation type of software development tool;
- obtaining a machine learning model based on the tool type indicator, the machine learning model trained on training source code associated with the specified one of the code labeling type of software development tool or the code transformation type of software development tool;
- generating the code insight for the target source code using the machine learning model, the code insight for the target source code comprising one of:
  - a predicted label for the target source code when the tool type indicator specifies that the software development tool comprises the code labeling type of software development tool; or
  - a predicted code transformation for the target source code when the tool type indicator specifies that the software development tool comprises the code transformation type of software building tool; and
- transmitting the code insight to the developer device, the code insight when received by the developer device causing a graphical user interface executing on the developer device to display the code insight on a display screen of the developer device,
- wherein generating the code insight for the target source code using the machine learning model comprises:
  - for each target source code snippet in the pair of target source code snippets, generating a vector representation for the corresponding target source code snippet using the machine learning model configured to receive a set of target features extracted from the corresponding target source code snippet as feature inputs;
  - determining a vector-space distance between the pair of target source code snippets based on the vector representations; and
  - determining the pair of target source code snippets are duplicates of one another when the vector-space distance satisfies a distance threshold.

13. The system of claim 12, wherein the operations further comprise:
- extracting a set of target features from the target source code, the set of target features corresponding to a syntactic representation of the target source code that is suitable for input to the machine learning model,
- wherein the machine learning model is configured to:
  - receive the set of target features as input; and
  - generate the code insight for the target source code as output.

14. The system of claim 13, wherein the syntactic representation of the target source code comprises an abstract syntax tree.

15. The system of claim 12, wherein obtaining the machine learning model comprises generating the machine learning model in response to receiving the code insight request by:
- selecting, from a source code repository stored on the memory hardware, the training source code associated with the specified one of the code labeling type of software development tool or the code transformation type of software development tool; and
- training, using a machine learning model generator, the machine learning model on the selected training source code.

16. The system of claim 15, wherein the operations further comprise extracting a set of training features from the selected training source code, the set of training features corresponding to a syntactic representation of the training source code that is suitable for training the machine learning model.

17. The system of claim 16, wherein the syntactic representation of the training source code comprises an abstract syntax tree.

18. The system of claim 12, wherein the operations further comprise:
- identifying from a source code repository stored on the memory hardware, training examples of the training source code paired with human-generated comments based on a review cycle of the training source code; and
- training the machine learning model on the training examples comprising the training source code paired with the human-generated comments.

19. The system of claim 12, wherein the operations further comprise, when the predicted code transformation for the target source code comprises compiled or interpreted code, training the machine learning model on training examples comprising the training source code paired with corresponding training executable code resulting from compiling or interpreting the training source code.

20. The system of claim 12, wherein generating the code insight for the target source code using the machine learning model comprises:
- determining similarity scores for a pool of training source code snippets stored in the memory hardware, each similarity score associated with a corresponding training code snippet and indicating a level of similarity between the vector representation for the target source code and a respective vector representation for the corresponding training code snippet; and
- identifying one or more training source code snippets from the pool of training source code snippets that have similarity scores satisfying a similarity threshold as corresponding to mutations of the target source code.

21. The system of claim 12, wherein the predicted label for the training source code comprises at least one of:
- a predicted level of complexity of the target source code;
- a predicted quality of the target source code;
- a predicted testing requirement for the target source code; or
- a predicted difficulty rating of the target source code.

22. The system of claim 12, wherein the predicted code transformation for the target source code comprises at least one of:
- updated target source code fixing a build error in the target source code;
- executable code interpreted/compiled from the target source code;
- a revision to the target source code; or suggested replacement source code for replacing the target source code.

* * * * *